(12) United States Patent
Imura et al.

(10) Patent No.: US 12,196,320 B2
(45) Date of Patent: Jan. 14, 2025

(54) SLIDING COMPONENT

(71) Applicant: EAGLE INDUSTRY CO., LTD., Tokyo (JP)

(72) Inventors: Tadatsugu Imura, Tokyo (JP); Iwa Ou, Tokyo (JP); Shogo Fukuda, Tokyo (JP); Kenta Uchida, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/913,153

(22) PCT Filed: Mar. 30, 2021

(86) PCT No.: PCT/JP2021/013524
§ 371 (c)(1),
(2) Date: Sep. 20, 2022

(87) PCT Pub. No.: WO2021/200938
PCT Pub. Date: Oct. 7, 2021

(65) Prior Publication Data
US 2023/0175587 A1   Jun. 8, 2023

(30) Foreign Application Priority Data
Mar. 31, 2020 (JP) ................. 2020-062821

(51) Int. Cl.
*F16J 15/34* (2006.01)
*F16C 33/74* (2006.01)
(52) U.S. Cl.
CPC ........... *F16J 15/3412* (2013.01); *F16C 33/74* (2013.01); *F16J 15/3424* (2013.01)

(58) Field of Classification Search
CPC ...... F16J 15/34; F16J 15/3404; F16J 15/3408; F16J 15/3412; F16J 15/3424
See application file for complete search history.

(56) References Cited

U.S. PATENT DOCUMENTS

| | | | |
|---|---|---|---|
| 3,383,116 A | 5/1968 | Carter | ............................ 277/96 |
| 3,527,465 A | 9/1970 | Guinard | |

(Continued)

FOREIGN PATENT DOCUMENTS

| | | | | |
|---|---|---|---|---|
| CN | 1245552 | 2/2000 | ............... | F16J 15/34 |
| CN | 2460801 | 11/2001 | ............... | F16J 15/40 |

(Continued)

OTHER PUBLICATIONS

International Search Report and Written Opinion issued in PCT/JP2021/013524, dated Jun. 15, 2021, with English translation, 15 pages.

(Continued)

*Primary Examiner* — Gilbert Y Lee
(74) *Attorney, Agent, or Firm* — HAYES SOLOWAY P.C.

(57) ABSTRACT

In a sliding component formed in an annular shape and disposed at a relatively rotating position of a rotating machine and sliding relative to an opposite sliding component, a sliding surface of the sliding component is provided with a conduction groove communicating with an outer space and a dynamic pressure generation groove communicating with the conduction groove, extending in a circumferential direction, and having a closed terminating end portion and at least a part of a bottom portion of the conduction groove is provided with an inclined surface inclined with respect to a radial direction.

20 Claims, 14 Drawing Sheets

(56) References Cited

U.S. PATENT DOCUMENTS

| | | | |
|---|---|---|---|
| 3,675,935 A | 7/1972 | Ludwig | F16J 15/342 |
| 3,704,019 A | 11/1972 | McHugh | 277/400 |
| 3,782,737 A | 1/1974 | Ludwig et al. | 277/27 |
| 4,056,478 A | 11/1977 | Capelli | C01M 5/00 |
| 4,071,253 A | 1/1978 | Heinen et al. | 277/3 |
| 4,523,764 A | 6/1985 | Albers et al. | 277/3 |
| 4,889,348 A | 12/1989 | Amundson | 277/306 |
| 5,071,141 A | 12/1991 | Lai et al. | |
| 5,092,612 A | 3/1992 | Victor et al. | 277/96.1 |
| 5,174,584 A | 12/1992 | Lahrman | 277/400 |
| 5,180,173 A | 1/1993 | Kimura et al. | |
| 5,224,714 A | 7/1993 | Kimura | 277/400 |
| 5,447,316 A | 9/1995 | Matsui | 277/400 |
| 5,556,111 A | 9/1996 | Sedy | 277/400 |
| 5,558,341 A | 9/1996 | McNickle | 277/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A | 11/2000 | Wang | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 | 7/2010 | Roberts-Haritonov | 277/401 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,667 B2 | 2/2017 | Takahashi et al. | F16J 15/342 |
| 9,772,037 B2 | 9/2017 | Itadani et al. | F16J 15/3412 |
| 9,784,372 B2 | 10/2017 | Iguchi | F16J 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/164 |
| 10,337,620 B2 | 7/2019 | Tokunaga et al. | F16J 15/342 |
| 10,443,737 B2 | 10/2019 | Itadani | F16J 15/342 |
| 10,495,228 B2 | 12/2019 | Itadani | F16J 15/342 |
| 10,865,883 B2 | 12/2020 | Seki et al. | F16J 15/3404 |
| 11,248,706 B2 | 2/2022 | Imura | F16C 33/74 |
| 11,320,052 B2 | 5/2022 | Imura et al. | F16J 15/34 |
| 11,530,749 B2 | 12/2022 | Kimura et al. | F16J 15/164 |
| 11,603,934 B2 * | 3/2023 | Imura | F16J 15/3412 |
| 2002/0014743 A1 | 2/2002 | Zheng | 277/358 |
| 2002/0093141 A1 | 7/2002 | Wang | F16J 15/34 |
| 2002/0158416 A1 | 10/2002 | Hosanna | F16J 15/3404 |
| 2004/0080112 A1 | 4/2004 | Tejima | F16J 15/3436 |
| 2005/0212217 A1 | 9/2005 | Tejima | 277/399 |
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0050260 A1 | 2/2008 | Iwanami et al. | 418/55.6 |
| 2008/0100001 A1 | 5/2008 | Flaherty | |
| 2009/0200749 A1 | 8/2009 | Teshima | F16J 15/3484 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrufer | C10M 103/02 |
| 2013/0209011 A1 | 8/2013 | Tokunaga | |
| 2013/0323105 A1 | 12/2013 | Chao et al. | F04C 29/028 |
| 2014/0159314 A1 | 6/2014 | Hosoe | F16J 15/34 |
| 2014/0197600 A1 | 7/2014 | Hosoe | F16J 15/342 |
| 2014/0217676 A1 | 8/2014 | Hosoe et al. | 277/350 |
| 2014/0319761 A1 | 10/2014 | Theike et al. | |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0345642 A1 | 12/2015 | Haas | F16J 15/3496 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/3412 |
| 2017/0146014 A1 | 5/2017 | Ohta et al. | F04C 29/0021 |
| 2017/0241549 A1 | 8/2017 | Itadani | F16J 15/3412 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 | 1/2018 | Hosoe et al. | F16J 15/164 |
| 2018/0051809 A1 * | 2/2018 | Yoshida | F16J 15/3412 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |
| 2018/0292010 A1 | 10/2018 | Ohya et al. | F16J 15/34 |
| 2018/0299015 A1 | 10/2018 | Itadani | F16J 15/3448 |
| 2019/0169988 A1 | 6/2019 | Tokunaga et al. | F01C 19/12 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0224768 A1 | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0164571 A1 * | 6/2021 | Kimura | F16J 15/3412 |
| 2021/0364034 A1 | 11/2021 | Okada | F16J 15/342 |
| 2022/0056949 A1 | 2/2022 | Ikeda et al. | F16C 17/04 |
| 2022/0128088 A1 * | 4/2022 | Suzuki | F16C 33/107 |
| 2023/0027772 A1 | 1/2023 | Suzuki et al. | F16C 17/02 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 106029294 | 10/2016 | B23K 26/364 |
| CN | 205877184 | 1/2017 | F16J 15/16 |
| CN | 205877198 | 1/2017 | F16J 15/34 |
| CN | 106439023 | 2/2017 | F16J 15/16 |
| CN | 107489770 | 12/2017 | F16J 15/34 |
| CN | 206802309 | 12/2017 | F16J 15/40 |
| CN | 107906206 | 4/2018 | F16J 15/34 |
| CN | 207740464 | 8/2018 | F16J 15/34 |
| CN | 109237042 | 1/2019 | F16J 15/34 |
| CN | 110770456 | 2/2020 | F16C 33/12 |
| CN | 110925426 | 3/2020 | F16J 15/16 |
| CN | 111656065 | 9/2020 | F16J 15/34 |
| DE | 3223703 | 6/1982 | F16J 15/34 |
| DE | 102008038396 | 2/2010 | F16J 15/34 |
| EP | 0369295 | 11/1988 | F16J 15/34 |
| EP | 0518681 | 12/1992 | G11B 15/60 |
| EP | 0637706 | 8/1993 | F16J 15/34 |

(56) References Cited

FOREIGN PATENT DOCUMENTS

| | | | | |
|---|---|---|---|---|
| EP | 2138225 | 12/2009 | ............... | B01J 13/20 |
| EP | 2754931 | 7/2014 | ............... | F16J 15/34 |
| EP | 3112078 | 1/2017 | ........... | B23K 26/364 |
| EP | 3196516 | 7/2017 | ............... | F16J 15/34 |
| EP | 3217049 | 9/2017 | ............... | F16J 15/34 |
| EP | 3273117 | 1/2018 | ............... | F16J 15/18 |
| EP | 3396186 | 10/2018 | ............... | F16C 33/10 |
| EP | 3575621 | 12/2019 | ............... | F16C 33/10 |
| EP | 3575643 | 12/2019 | ............... | F16J 15/34 |
| EP | 3650722 | 5/2020 | ............... | F16C 33/12 |
| EP | 3653913 | 5/2020 | ............... | F16J 15/34 |
| FR | 2342440 | 9/1997 | ............... | F16J 15/34 |
| GB | 1509482 | 5/1978 | ............... | F16C 33/10 |
| GB | 2263952 | 8/1993 | ............... | F16J 15/34 |
| JP | S51-034974 | 3/1976 | | |
| JP | S52-143571 | 10/1977 | ............... | F16J 15/26 |
| JP | 57163770 | 10/1982 | ........... | F16J 15/3412 |
| JP | S59-195253 | 12/1984 | ............... | F16J 15/34 |
| JP | S59-195254 | 12/1984 | ............... | F16J 15/34 |
| JP | S61-8402 | 1/1986 | ............... | F01C 1/01 |
| JP | S63-134883 | 6/1988 | ............... | F04C 18/02 |
| JP | S63-190975 | 8/1988 | ............... | F16J 15/34 |
| JP | H02-16381 | 1/1990 | ............... | F04C 18/02 |
| JP | H02-236067 | 9/1990 | ............... | F16J 15/34 |
| JP | H02-136863 | 11/1990 | ............... | F16J 15/34 |
| JP | H04-50559 | 2/1992 | ............... | F16J 15/34 |
| JP | H04-337165 | 11/1992 | ............... | F16J 15/34 |
| JP | H04-362289 | 12/1992 | ............... | F04C 18/02 |
| JP | H05-60247 | 3/1993 | ............... | F16J 15/34 |
| JP | H05-296248 | 11/1993 | | |
| JP | H05-90049 | 12/1993 | ............... | F16J 15/34 |
| JP | H06-17941 | 1/1994 | ............... | F16J 15/34 |
| JP | H06-117547 | 4/1994 | ............... | F16J 15/34 |
| JP | H06-174107 | 6/1994 | ............... | F16J 15/34 |
| JP | H06-323442 | 11/1994 | ............... | F16J 15/34 |
| JP | H06-105105 | 12/1994 | ............... | F16J 15/34 |
| JP | H07-43038 | 5/1995 | ............... | F16J 15/34 |
| JP | 9-89119 | 3/1997 | ............... | F16J 15/34 |
| JP | 9-292034 | 11/1997 | ............... | F16J 15/34 |
| JP | H10-281299 | 10/1998 | ............... | F16J 15/34 |
| JP | H10-292867 | 11/1998 | | |
| JP | H10-339286 | 12/1998 | ............... | F04C 18/02 |
| JP | H11-132163 | 5/1999 | ............... | F04C 18/02 |
| JP | H11-287329 | 10/1999 | ............... | F16J 15/34 |
| JP | 3066367 | 5/2000 | ............... | F16J 15/34 |
| JP | 2001-12458 | 1/2001 | ............... | F16C 17/10 |
| JP | 2003-343730 | 12/2003 | ............... | F16J 15/22 |
| JP | 2005-155894 | 6/2005 | ............... | F16C 17/04 |
| JP | 2005-180652 | 7/2005 | ............... | F16J 15/34 |
| JP | 2005-315391 | 11/2005 | | |
| JP | 2005-337503 | 12/2005 | ............... | F61J 15/34 |
| JP | 2006-9614 | 1/2006 | ............... | F04C 18/08 |
| JP | 2006-77899 | 3/2006 | ............... | F16J 15/34 |
| JP | 2006-90524 | 4/2006 | ............... | F16C 17/02 |
| JP | 2006-183702 | 7/2006 | ............... | F16C 17/04 |
| JP | 2006-316677 | 11/2006 | ............... | F04C 18/02 |
| JP | 2007-162045 | 6/2007 | | |
| JP | 2008-51018 | 3/2008 | ............... | F04C 18/02 |
| JP | 2008-51030 | 3/2008 | ............... | F04C 18/02 |
| JP | 2008-106940 | 5/2008 | ............... | F16J 15/34 |
| JP | 2011-74931 | 4/2011 | ............... | F16J 15/34 |
| JP | 2011-185292 | 9/2011 | ............... | F16J 15/34 |
| JP | 2012-2295 | 1/2012 | ............... | F16J 15/34 |
| JP | 2012-062534 | 3/2012 | | |
| JP | 2012-82794 | 4/2012 | ............... | F04C 18/02 |
| JP | 2012-122135 | 6/2012 | ............... | C25D 15/02 |
| JP | 2013-167216 | 8/2013 | ............... | F04C 18/02 |
| JP | 2013-213545 | 10/2013 | ............... | F16C 32/06 |
| JP | 2014-529052 | 10/2014 | | |
| JP | 2015-063647 | 4/2015 | | |
| JP | 2015-68330 | 4/2015 | ............... | F04C 29/00 |
| JP | 5693599 | 4/2015 | | |
| JP | 2015-183631 | 10/2015 | ............... | F04C 2/10 |
| JP | 2016-61208 | 4/2016 | ............... | F04C 18/02 |
| JP | 2016-80090 | 5/2016 | ............... | F16J 15/34 |
| JP | 5960145 | 7/2016 | ............... | F16J 15/34 |
| WO | WO2006051702 | 5/2003 | ............... | F16J 15/34 |
| WO | WO2011115073 | 9/2011 | ............... | F16J 15/34 |
| WO | WO2012046749 | 4/2012 | ............... | F16J 15/34 |
| WO | WO2013035503 | 3/2013 | ............... | F16J 15/34 |
| WO | WO2013053411 | 4/2013 | | |
| WO | WO2014061544 | 4/2014 | | |
| WO | WO2014148316 | 9/2014 | ............... | F16J 15/34 |
| WO | WO2014148317 | 9/2014 | ............... | F16J 15/34 |
| WO | WO2014174725 | 10/2014 | ............... | F16J 15/34 |
| WO | WO2015111707 | 7/2015 | ............... | F16J 15/18 |
| WO | WO2016035860 | 3/2016 | ............... | F16J 15/34 |
| WO | WO2016167262 | 10/2016 | ............... | F16J 15/34 |
| WO | WO2016186015 | 11/2016 | ............... | F16J 15/34 |
| WO | WO2016186019 | 11/2016 | ............... | F16J 15/34 |
| WO | WO2016186020 | 11/2016 | ............... | F16J 15/34 |
| WO | WO2016203878 | 12/2016 | ............... | F16J 15/34 |
| WO | WO2017002774 | 1/2017 | ............... | F16J 15/34 |
| WO | WO2017061406 | 4/2017 | ............... | F16J 15/34 |
| WO | WO2018025629 | 2/2018 | ............... | F02B 55/02 |
| WO | WO2018092742 | 5/2018 | ............... | F16J 15/34 |
| WO | WO2018105505 | 6/2018 | ............... | F16J 33/12 |
| WO | WO2018139231 | 8/2018 | ............... | F16J 15/34 |
| WO | WO2019013233 | 1/2019 | ............... | F16J 15/34 |
| WO | WO2019221227 | 11/2019 | ............... | F16J 15/18 |
| WO | WO-2019221231 A1 * | 11/2019 | ............... | F16J 15/182 |
| WO | WO2020129846 | 6/2020 | ............... | F16C 17/04 |
| WO | WO2021125201 | 6/2021 | ............... | F16J 15/18 |

OTHER PUBLICATIONS

International Preliminary Report on Patentability issued in PCT/JP2021/013524, dated Oct. 13, 2022, 7 pages.
International Search Report and Written Opinion issued in PCT/JP2021/016916, dated Jul. 13, 2021, with English translation, 13 pages.
International Preliminary Report on Patentability issued in PCT/JP2021/016916, dated Nov. 24, 2022, 6 pages.
European Search Report issued in related application No. 21779618.4, dated Mar. 18, 2024, 8 pages.
European Search Report issued in related application No. 21804030.1, dated Apr. 25, 2024, 8 pages.
Korean Official Action issued in related Korean Application 10-2022-7033234, dated Apr. 20, 2024 with translation, 12 pages.
Official Action issued in related U.S. Appl. No. 17/913,153, dated Jun. 20, 2024, 8 pages.
Official Action issued in related U.S. Appl. No. 17/923,565, dated Jun. 14, 2024, 5 pages.

* cited by examiner

SLIDING COMPONENT

TECHNICAL FIELD

The present invention relates to sliding components that rotate relative to each other and are used for, for example, a shaft sealing device shaft-sealing a rotary shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device that prevents a leakage of a sealing target fluid, for example, a mechanical seal includes a pair of annular sliding components rotating relative to each other so that sliding surfaces slide on each other. In such a mechanical seal, there has been a recent demand to reduce the energy lost caused by sliding for environmental measures and the like.

For example, in a mechanical seal shown in Patent Citation 1, a dynamic pressure generation mechanism is provided on a sliding surface of one sliding component. This dynamic pressure generation mechanism includes a conduction groove which communicates with an outer space in which a sealing target fluid exists and extends in a radial direction and a dynamic pressure generation groove which extends from the conduction groove in a circumferential direction and has a closed terminating end and the conduction groove is formed to be deeper than the dynamic pressure generation groove. Accordingly, a sealing target fluid is introduced from the outer space into the dynamic pressure generation groove through the conduction groove, the sealing target fluid moves toward the terminating end of the dynamic pressure generation groove, a positive pressure is generated at the terminating end of the dynamic pressure generation groove to separate the sliding surfaces from each other, and the sealing target fluid is interposed between the sliding surfaces during the relative rotation of the sliding component. As a result, lubricity is improved.

CITATION LIST

Patent Literature

Patent Citation 1: WO 2012/046749 A (Page 17, FIG. 1)

SUMMARY OF INVENTION

Technical Problem

In the sliding component shown in Patent Citation 1, since the conduction groove is filled with the fluid, the fluid is reliably supplied from the conduction groove to the dynamic pressure generation groove during the relative rotation of the sliding component. However, since the conduction groove is deeper than the dynamic pressure generation groove and is filled with a large amount of the fluid, a contamination is accumulated in the conduction groove. As a result, there is a risk that the contamination would get caught between the sliding surfaces and cause abrasive wear.

The present invention has been made in view of such problems and an object thereof is to provide a sliding component capable of suppressing a contamination from being accumulated in a conduction groove.

Solution to Problem

In order to solve the foregoing problems, a sliding component according to the present invention is a sliding component formed in an annular shape and disposed at a relatively rotating position of a rotating machine and sliding relative to an opposite sliding component, wherein a sliding surface of the sliding component is provided with a conduction groove communicating with an outer space and a dynamic pressure generation groove communicating with the conduction groove, extending in a circumferential direction, and having a closed terminating end portion, and wherein at least a part of a bottom portion of the conduction groove is provided with an inclined surface inclined with respect to a radial direction. According to the aforesaid feature of the present invention, the fluid on the upper surface side of the conduction groove mainly receives a shear force, a vortex flow having a radial center is generated in the conduction groove, the vortex flow is inclined along the inclined surface due to the influence of the inclined surface, and a component flowing in the radial direction is generated in the fluid in the conduction groove during the relative rotation of the sliding component. In this way, it is possible to induce a flow of the fluid flowing in the conduction groove in the radial direction, to discharge the contamination flowing into the conduction groove to the outside of the conduction groove, and to suppress the contamination from being accumulated in the conduction groove.

It may be preferable that the inclined surface is formed entirely through the bottom portion of the conduction groove in the radial direction. According to this preferable configuration, the fluid smoothly flows in the conduction groove in the radial direction.

It may be preferable that the conduction groove has a first radial end portion on a side of the outer space and a second radial end portion on a side opposite to the outer space, a circumferential width of the first radial end portion being larger than a circumferential width of the second radial end portion. According to this preferable configuration, since the peripheral surface on the side of the outer space of the sliding component in the radial direction and the side wall surface of the conduction groove are likely to be formed at an angle along the circumferential direction, in other words, an obtuse angle and the fluid is likely to move along the side wall surface of the conduction groove and the peripheral surface of the sliding component on the side of the outer space in the radial direction due to the viscosity, it is easy to take the fluid of the outer space into the conduction groove and to easily discharge the fluid in the conduction groove to the outer space.

It may be preferable that the dynamic pressure generation groove wholly communicates with a portion of the conduction groove shallower than the inclined surface. According to this preferable configuration, it is possible to ensure a large communication area between the dynamic pressure generation groove and the conduction groove. Further, since a step is formed between the conduction groove and the dynamic pressure generation groove, the contamination existing in the conduction groove does not easily enter the dynamic pressure generation groove.

It may be preferable that the inclined surface is continuous connected to the sliding surface. According to this preferable configuration, the fluid is easily discharged between the conduction groove and the sliding surfaces.

It may be preferable that a side wall portion of the conduction groove has an arc shape when viewed from an axial direction. According to this preferable configuration, the fluid in the conduction groove smoothly flows in the radial direction along the side wall portion.

It may be preferable that the dynamic pressure generation groove communicates with the outer space. According to this preferable configuration, even when the contamination flows into the dynamic pressure generation groove, the contamination is easily discharged to the outer space.

It may be preferable that the dynamic pressure generation groove and the outer space is separated from each other by a land portion. According to this preferable configuration, since it is possible to suppress the fluid in the dynamic pressure generation groove from leaking to the outer space, it is possible to generate the positive pressure and the negative pressure as the high dynamic pressure in the dynamic pressure generation groove.

In addition, the outer space according to the present invention may be the outer space existing on the outer radial side of the sliding component or the inner space existing on the inner radial side of the sliding component.

DESCRIPTION OF EMBODIMENTS

Figure 1:
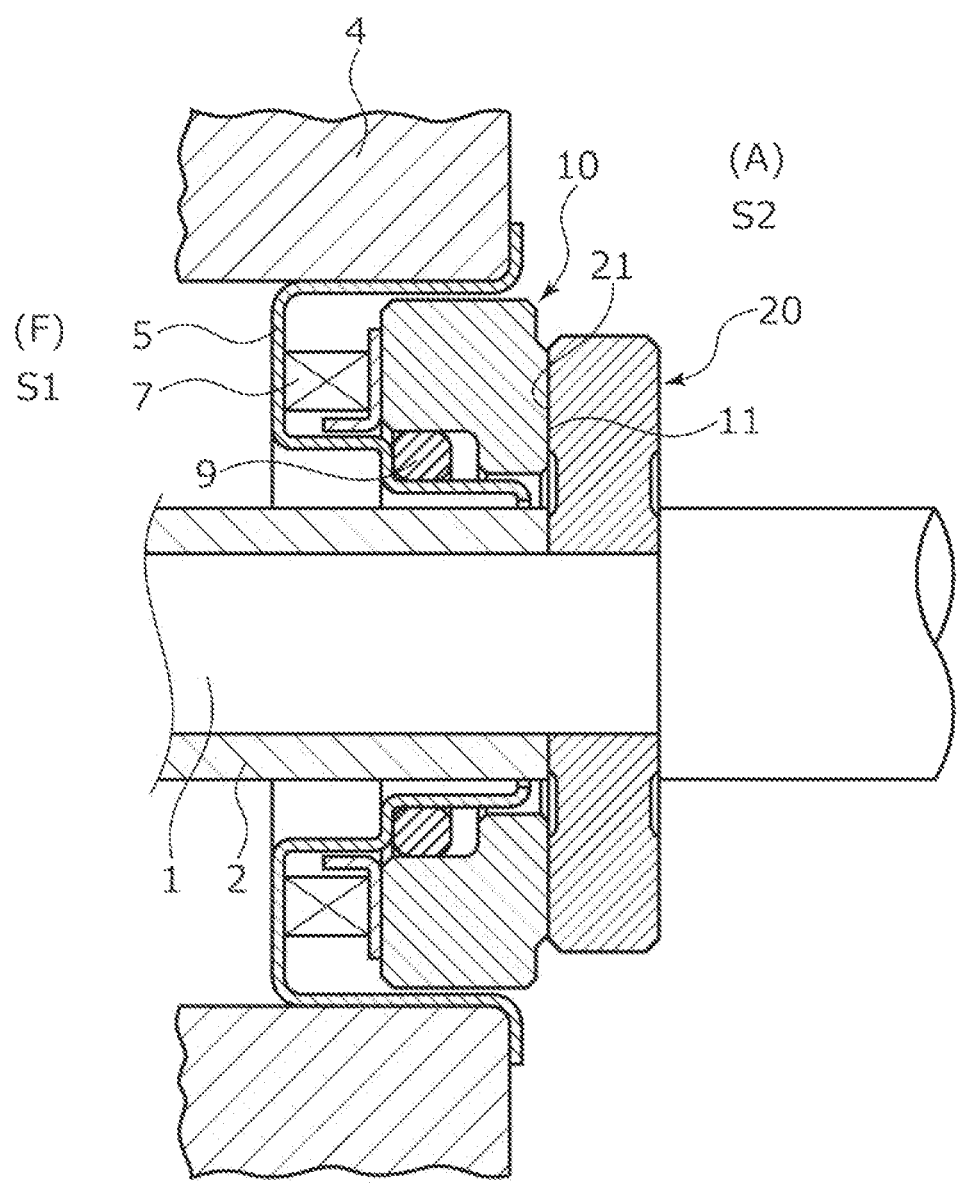
FIG. 1 is a longitudinal sectional view showing an example of a mechanical seal including a sliding component according to a first embodiment of the present invention.

Modes for carrying out a sliding component according to the present invention will be described below on the basis of the embodiments.

First Embodiment

A sliding component according to a first embodiment of the present invention will be described with reference to FIGS. 1 to 6. Additionally, in this embodiment, an embodiment in which a sliding component is a mechanical seal will be described as an example. Further, a description will be made such that a sealing target fluid F exists in an inner space S1 corresponding to an outer space on an inner radial side of the mechanical seal and an atmosphere A exists in an outer space S2 corresponding to an outer space on an outer radial side thereof. Further, for convenience of description, in the drawings, dots may be added to a groove and the like formed on a sliding surface.

A mechanical seal for general industrial machines shown in FIG. 1 is of an outside type that seals a sealing target fluid F tending to leak from an inner radial side to an outer radial side of a sliding surface. Additionally, in this embodiment, an embodiment in which the sealing target fluid F is a high-pressure liquid and the atmosphere A is a gas having a pressure lower than that of the sealing target fluid F is illustrated.

The mechanical seal mainly includes a rotating seal ring 20 which is the other annular sliding component provided in a rotary shaft 1 through a sleeve 2 to be rotatable together with the rotary shaft 1, a casing 5 which is fixed to a housing 4 of an attachment target device, an annular stationary seal ring 10 which is a sliding component provided not to be rotatable with respect to the casing 5 and to be movable in the axial direction, a secondary seal 9 which seals a gap between the casing 5 and the stationary seal ring 10 in the radial direction, and an urging means 7 disposed between the casing 5 and the stationary seal ring 10 and when the urging means 7 urges the stationary seal ring 10 in the axial direction, a sliding surface 11 of the stationary seal ring 10 and a sliding surface 21 of the rotating seal ring 20 slide closely with each other. Additionally, the sliding surface 21 of the rotating seal ring 20 is formed as a flat surface and this flat surface is not provided with a concave portion such as a groove.

The stationary seal ring 10 and the rotating seal ring 20 are typically formed of SiC (as an example of hard material) or a combination of SiC and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., a coating material), a composite material, and the like can also be applied.

Figure 2:
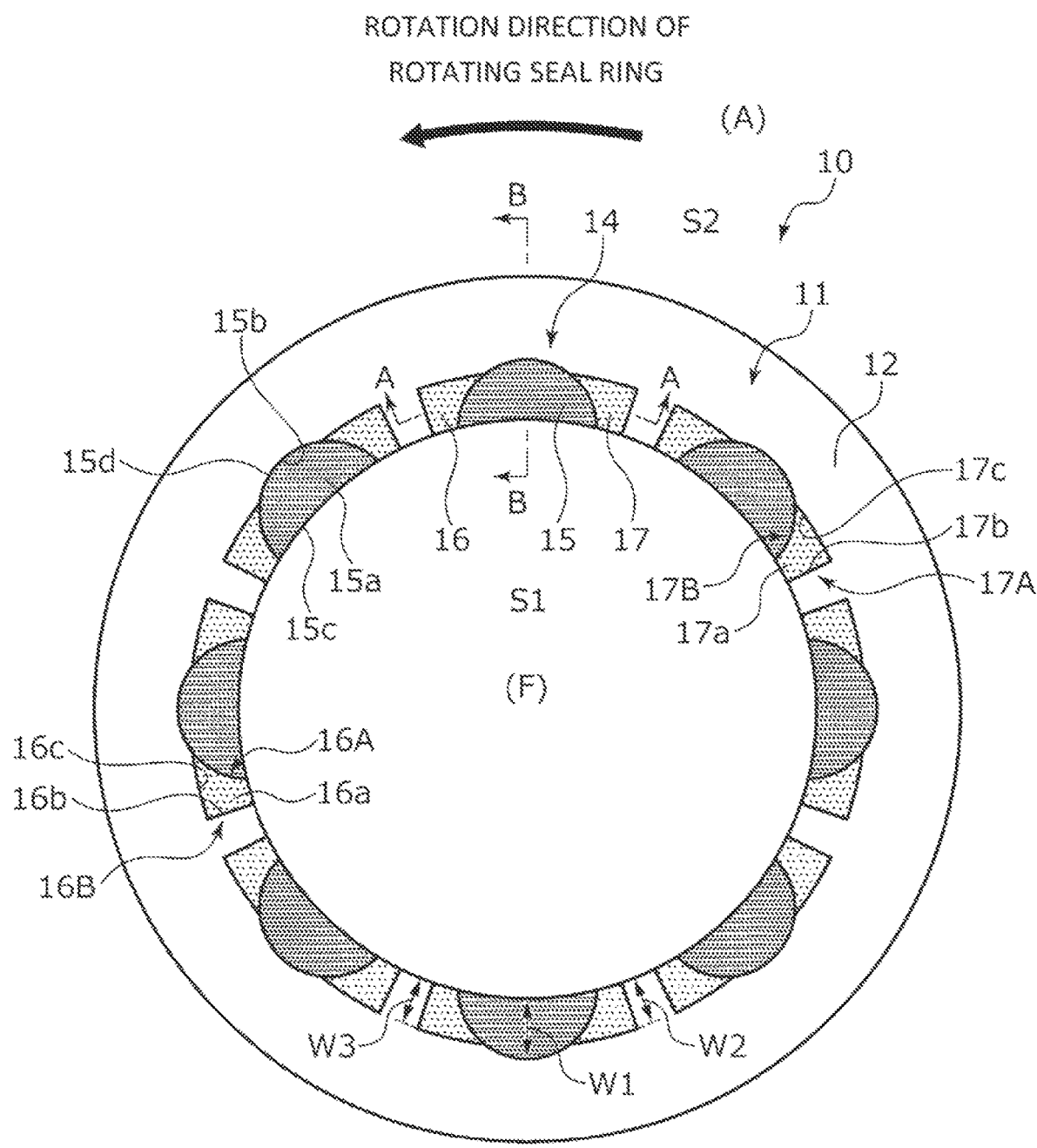
FIG. 2 is a view showing a sliding surface of a stationary seal ring from the axial direction in the first embodiment.

As shown in FIG. 2, the rotating seal ring 20 slides relative to the stationary seal ring 10 counterclockwise as indicated by the arrow. In the sliding surface 11 of the stationary seal ring 10, a plurality of (in the first embodiment, eight) dynamic pressure generation mechanisms 14 are evenly provided in the circumferential direction on the inner radial side. Additionally, a portion other than the dynamic pressure generation mechanism 14 of the sliding surface 11 is formed as a land 12 of which an upper portion is a flat surface. Further, a positive pressure generation mechanism such as a dimple may be formed on the outer radial side of the sliding surface 11.

Figure 3:
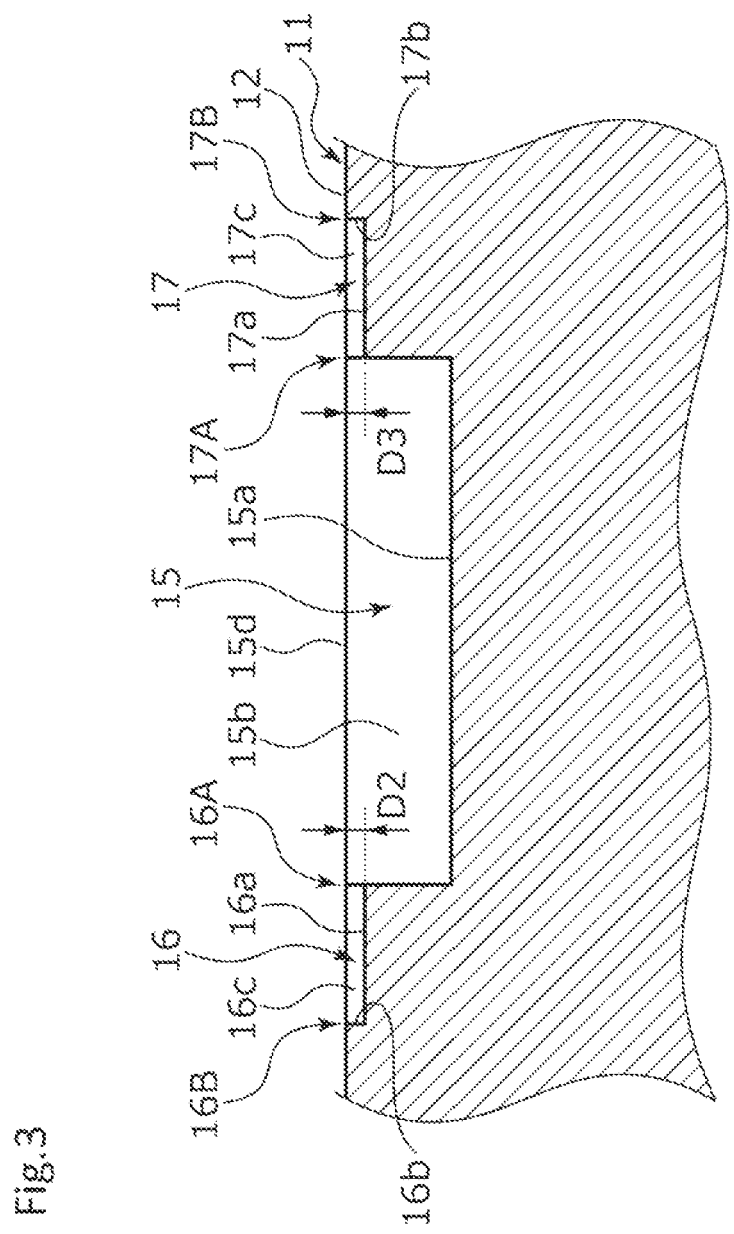
FIG. 3 is a cross-sectional view taken along the line A-A.
Figure 4:
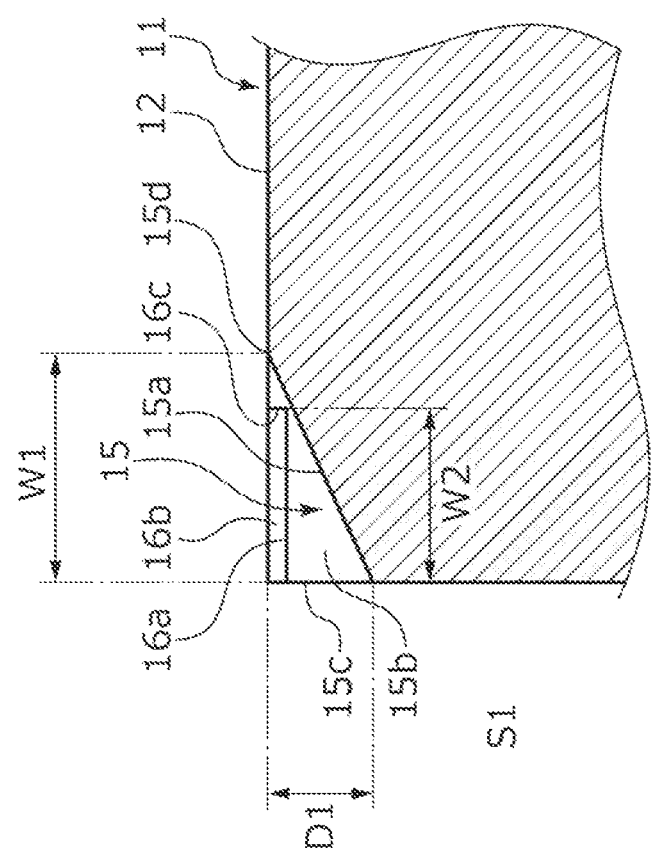
FIG. 4 is a cross-sectional view taken along the line B-B.

Next, the outline of the dynamic pressure generation mechanism 14 will be described with reference to FIGS. 2 to 4. Additionally, hereinafter, for convenience of description, a fluid guide groove 15 is depicted to be shallower than the actual depth.

The dynamic pressure generation mechanism 14 includes a fluid guide groove 15 which is a conduction groove communicating with the inner space S1, a first dynamic pressure generation groove 16 which extends in the circumferential direction counterclockwise from the fluid guide groove 15 and generates a positive pressure, and a second dynamic pressure generation groove 17 which extends in the circumferential direction clockwise from the fluid guide groove 15 and generates a negative pressure.

The fluid guide groove 15 includes a bottom surface 15a which is a bottom portion having a semi-circular shape protruding toward the outer radial side when viewed from the axial direction and a side wall portion 15b which extends vertically along the flat surface of the land 12 along the side edge forming an arc shape of the bottom surface 15a. In this way, a communication portion 15c (that is, the radial end portion on the side of the outer space) communicating with the inner space S1 in the fluid guide groove 15 is formed to have a circumferential width larger than a top portion side portion on the outer radial side of the fluid guide groove 15, that is, an outermost radial portion 15d.

Further, the bottom surface 15a is an inclined surface 15a which is formed as a flat surface that gradually becomes shallow in the radial direction from the inner radial side toward the outer radial side and the outermost radial portion 15d (that is, the end portion on the side opposite to the outer space in the radial direction) of the bottom surface 15a extends to the flat surface of the land 12. That is, a surface that is inclined over the entire radial direction of the bottom surface 15a is formed. Further, the fluid guide groove 15 has a maximum radial width W1 in the outermost radial portion 15d.

Further, the innermost radial portion of the fluid guide groove 15, that is, the communication portion 15c has the deepest depth D1. The depth D1 of this embodiment is 100 μm. Additionally, the deepest depth D1 of the fluid guide groove 15 can be freely changed.

Further, the fluid guide groove 15 has a symmetrical shape in the circumferential direction with respect to a virtual line LN (see FIG. 5) extending in the radial direction.

In the first dynamic pressure generation groove 16, a relative rotation starting end portion 16A communicates with the fluid guide groove 15 and a relative rotation terminating end portion 16B is closed. Specifically, the first dynamic pressure generation groove 16 includes a bottom surface 16a which is flat from the starting end portion 16A to the terminating end portion 16B and is parallel to the flat surface of the land 12, a wall portion 16b which extends vertically toward the flat surface of the land 12 from the end edge of the terminating end portion 16B of the bottom surface 16a, and a side wall portion 16c which extends vertically toward the flat surface of the land 12 from the side edge of the bottom surface 16a on the outer radial side and the side edge of the bottom surface 16a on the inner radial side communicates with the inner space S1.

In the first dynamic pressure generation groove 16, the radial width W2 is constant in the circumferential direction and the width W2 is smaller than the width W1 (W1>W2).

Further, the first dynamic pressure generation groove 16 has a constant depth D2 from the starting end portion 16A to the terminating end portion 16B. The depth D2 of this embodiment is 10 μm. Additionally, the depth D2 of the first dynamic pressure generation groove 16 can be freely changed, but the depth D2 is preferably 1/10 times or less the depth D1.

In the second dynamic pressure generation groove 17, a relative rotation starting end portion 17A is closed and a relative rotation terminating end portion 17B communicates with the fluid guide groove 15. Specifically, the second dynamic pressure generation groove 17 includes a bottom surface 17a which is flat from the starting end portion 17A to the terminating end portion 17B and is parallel to the flat surface of the land 12, a wall portion 17b which extends vertically toward the flat surface of the land 12 from the end edge of the terminating end portion 17B of the bottom surface 17a, and a side wall portion 17c which extends vertically toward the flat surface of the land 12 from the side edge of the bottom surface 17a on the outer radial side and the side edge of the bottom surface 17a on the inner radial side communicates with the inner space S1.

In the second dynamic pressure generation groove 17, the radial width W3 is constant in the circumferential direction and the width W3 is smaller than the width W1 (W3≤W1). Further, the width W3 and the width W2 have the same dimension (W2=W3). Additionally, the width W2 and the width W3 may be different dimensions.

Further, the second dynamic pressure generation groove 17 has a constant depth D3 from the starting end portion 17A to the terminating end portion 17B. The depth D3 of this embodiment is 10 μm (D1=D2). Additionally, the depth D2 of the first dynamic pressure generation groove 16 and the depth D3 of the second dynamic pressure generation groove 17 may be different dimensions. Further, the depth D3 of the second dynamic pressure generation groove 17 can be freely changed, but the depth D3 is preferably 1/10 times or less the depth D1.

The first dynamic pressure generation groove 16 and the second dynamic pressure generation groove 17 form a symmetrical shape in the circumferential direction with respect to the virtual line LN extending in the radial direction.

Further, the first dynamic pressure generation groove 16 and the second dynamic pressure generation groove 17 communicate with each other in a region shallower than the bottom surface 15a of the fluid guide groove 15. That is, a step is formed by the bottom surface 15a of the fluid guide groove 15 and the side wall portion 15b interposed between the first dynamic pressure generation groove 16 and the second dynamic pressure generation groove 17.

Next, the flow of the sealing target fluid F during the relative rotation of the stationary seal ring 10 and the rotating seal ring 20 will be schematically described with reference to FIG. 5. Additionally, the flow of the sealing target fluid F of FIG. 5 is schematically depicted without specifying the relative rotation speed of the rotating seal ring 20.

First, since the urging means 7 urges the stationary seal ring 10 toward the rotating seal ring 20 in a non-operation state of the general industrial machine in which the rotating seal ring 20 is not rotating, the sliding surfaces 11 and 21 are in a contact state and there is almost no leakage amount of the sealing target fluid F in the first dynamic pressure generation groove 16 and the second dynamic pressure generation groove 17 from between the sliding surfaces 11 and 21 to the outer space S2.

Figure 5:
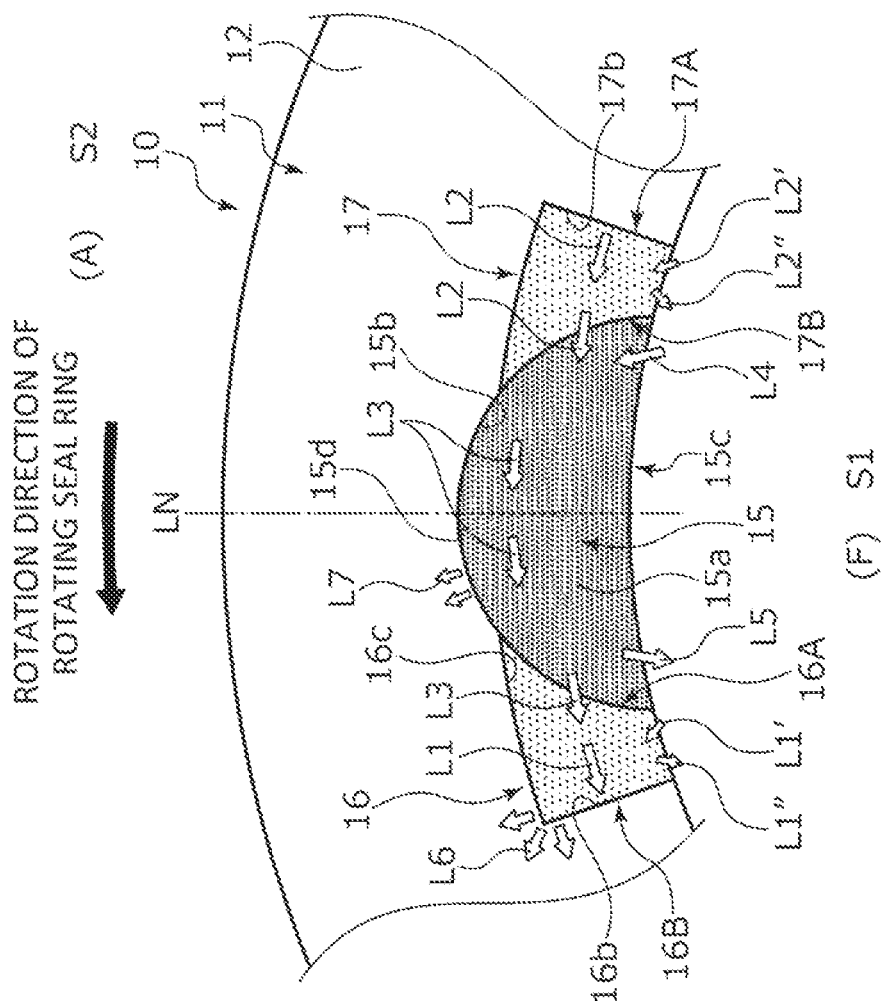
FIG. 5 is a schematic view showing a flow of a fluid in a conduction groove and a dynamic pressure generation groove during a relative rotation in the first embodiment.

As shown in FIG. 5, when the rotating seal ring 20 rotates relative to the stationary seal ring 10, the sealing target fluid F in the fluid guide groove 15, the first dynamic pressure generation groove 16, and the second dynamic pressure generation groove 17 moves along the rotation direction of the rotating seal ring 20 due to the friction with the sliding surface 21.

Specifically, the sealing target fluid F in the first dynamic pressure generation groove 16 moves from the starting end portion 16A toward the terminating end portion 16B as indicated by the arrow L1 and thus the sealing target fluid F in the fluid guide groove 15 flows into the first dynamic pressure generation groove 16 as indicated by the arrow L3.

The sealing target fluid F in the first dynamic pressure generation groove 16 moving toward the terminating end portion 16B increases the pressure in the wall portion 16b and the vicinity thereof. That is, a positive pressure is generated in the wall portion 16b and the vicinity thereof.

Further, since the first dynamic pressure generation groove 16 communicates with the inner space S1, a part of the sealing target fluid F in the inner space S1 flows into the first dynamic pressure generation groove 16 as indicated by the arrow L1' and a part of the sealing target fluid F in the first dynamic pressure generation groove 16 flows out to the inner space S1 as indicated by the arrow L1".

Further, as indicated by the arrow L2, the sealing target fluid F in the second dynamic pressure generation groove 17 moves from the starting end portion 17A toward the terminating end portion 17B and flows out into the fluid guide groove 15.

A negative pressure is generated in the second dynamic pressure generation groove 17 in which the sealing target fluid F moves toward the terminating end portion 17B. In the second dynamic pressure generation groove 17, the pressure of the starting end portion 17A becomes lower than the pressure of the terminating end portion 17B.

Further, since the second dynamic pressure generation groove 17 communicates with the inner space S1, a part of the sealing target fluid F in the inner space S1 flows into the second dynamic pressure generation groove 17 as indicated by the arrow L2' and a part of the sealing target fluid F in the second dynamic pressure generation groove 17 flows out to the inner space S1 as indicated by the arrow L2".

Further, as indicated by the arrow L3, the sealing target fluid F in the fluid guide groove 15, particularly, the sealing target fluid F at the upper side in the fluid guide groove 15 moves in the circumferential direction from the second dynamic pressure generation groove 17 toward the first dynamic pressure generation groove 16.

Since the fluid guide groove 15 communicates with the inner space S1, a part of the sealing target fluid F in the inner space S1 flows into the fluid guide groove 15 as indicated by the arrow L4 and a part of the sealing target fluid F in the fluid guide groove 15 flows out to the inner space S1 as indicated by the arrow L5.

Further, when the relative rotation speed of the stationary seal ring 10 and the rotating seal ring 20 becomes a certain level or more, the positive pressure increases in the wall portion 16b of the first dynamic pressure generation groove 16 and the vicinity thereof. As indicated by the arrow L6, the sealing target fluid F of the first dynamic pressure generation groove 16 flows out between the sliding surfaces 11 and 21 from the terminating end portion 16B. Accordingly, the sliding surfaces 11 and 21 are separated from each other. The sealing target fluid F of the first dynamic pressure generation groove 16 flows out between the sliding surfaces 11 and 21 toward the outer radial direction from a corner portion including the wall portion 16b and the side wall portion 16c.

On the other hand, since the negative pressure generated at the starting end portion 17A in the second dynamic pressure generation groove 17 increases and the sealing target fluid F between the sliding surfaces 11 and 21 existing in the vicinity of the starting end portion 17A can be drawn into the second dynamic pressure generation groove 17 and returned into the fluid guide groove 15, it is possible to suppress the sealing target fluid F between the sliding surfaces 11 and 21 from leaking to the outer space S2.

Further, the pressure of the sealing target fluid F in the fluid guide groove 15 is increased due to a shear force in a portion on the side of the first dynamic pressure generation groove 16 in the side wall portion 15b of the fluid guide groove 15, so that a positive pressure is generated. Accordingly, the sealing target fluid F in the fluid guide groove 15 slightly flows between the sliding surfaces 11 and 21 as indicated by the arrow L7.

Next, the flow of the sealing target fluid F in the fluid guide groove 15 will be described with reference to FIG. 6.

Figure 6:
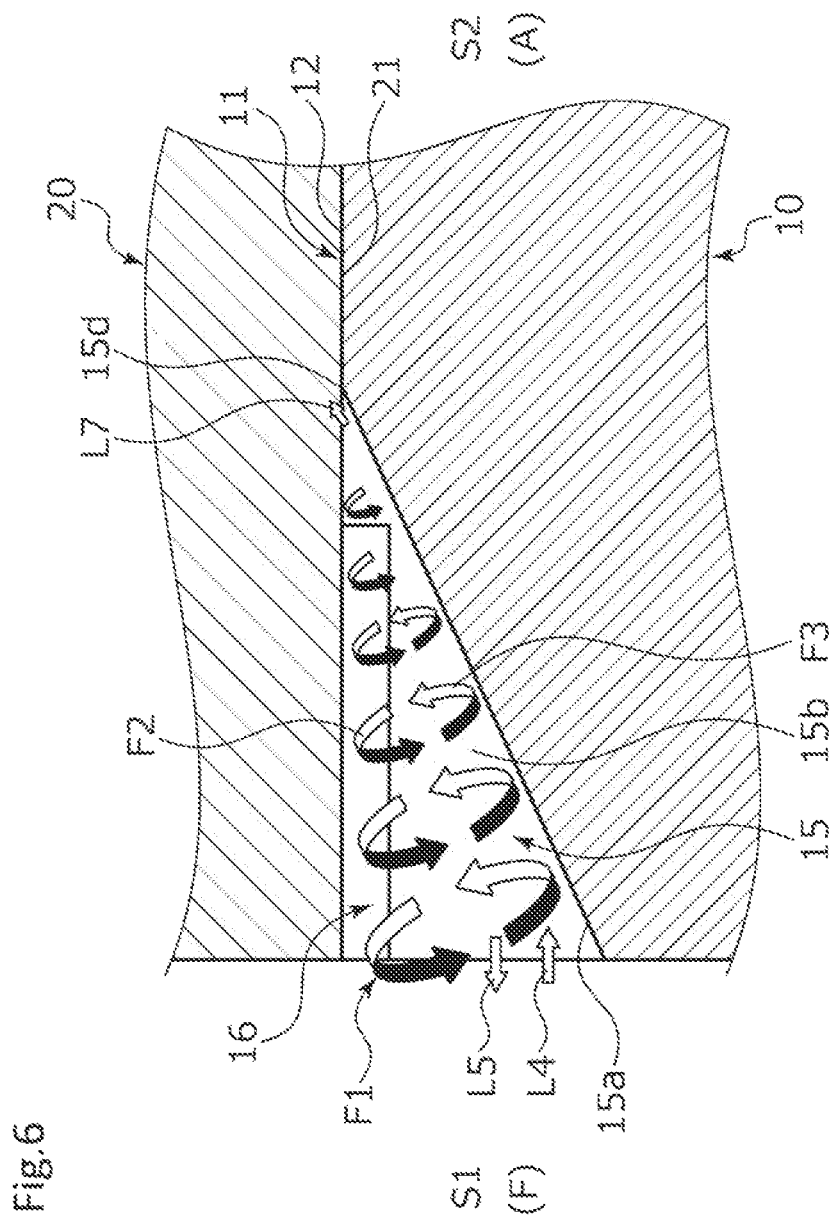
FIG. 6 is a schematic view showing a flow of a fluid in the conduction groove during the relative rotation in the first embodiment.

As shown in FIG. 6, the sealing target fluid F in the fluid guide groove 15, particularly, the sealing target fluid F on the upper side of the fluid guide groove 15 receives a shear force from the sliding surface 21 of the rotating seal ring 20 during the relative rotation of the stationary seal ring 10 and the rotating seal ring 20. Since the bottom surface 15a of the fluid guide groove 15 is inclined from the inner radial side toward the outer radial side, a vortex flow F1 (that is, a vortex flow F1 having a component flowing in the radial direction and a component turning in the circumferential direction) having a radial direction and a direction substantially along the inclination of the bottom surface 15a as a turning center is generated in the fluid guide groove 15. In FIG. 6, for convenience of description, a plurality of vortex flows in the radial direction are exemplified.

This vortex flow F1 swirls in the order of the sliding surface 21 of the rotating seal ring 20, the portion on the side of the first dynamic pressure generation groove 16 in the side wall portion 15b, the bottom surface 15a, and the portion on the side of the second dynamic pressure generation groove 17 in the side wall portion 15b when the fluid guide groove 15 is viewed from the inner space S1 in the radial direction.

Further, since the bottom surface 15a of the fluid guide groove 15 is inclined in the radial direction to be gradually shallower toward the outer radial side, the volume of the fluid that can flow differs depending on the radial position of the fluid guide groove 15. Accordingly, a difference in speed occurs depending on the radial position, and the vortex flow F1 has a component that flows in the radial direction. Further, since the bottom surface 15a is inclined, the fluid smoothly flows in the radial direction.

In this way, since the vortex flow F1 having a component flowing in the radial direction is generated during the relative rotation of the stationary seal ring 10 and the rotating seal ring 20, a part of the sealing target fluid F in the inner space S1 flows into the fluid guide groove 15 as indicated by the arrow L4 and a part of the sealing target fluid F in the fluid guide groove 15 flows out to the inner space S1 as indicated by the arrow L5.

Particularly, since the fluid guide groove 15 is shallow at the outermost radial portion 15d, the pressure of the sealing target fluid F in the fluid guide groove 15 becomes higher at the outermost radial portion 15d compared to the communication portion 15c when the relative rotation speed of the stationary seal ring 10 and the rotating seal ring 20 becomes a certain level or more. Accordingly, the sealing target fluid F of the inner space S1 indicated by the arrow L4 does not easily flow to the outermost radial portion 15d of the fluid guide groove 15 and, for example, most of the sealing target fluid F of the arrow L4 flows to the radial center portion of the fluid guide groove 15 and then folds back toward the inner space S1 (that is, the flow of the arrow L5).

As described above, the sealing target fluid F in the fluid guide groove 15 is influenced by the inclined bottom surface 15a during the relative rotation of the stationary seal ring 10 and the rotating seal ring 20, so that the vortex flow F1 is generated to be inclined in the radial direction. Thus, since a component flowing in the radial direction is generated in the sealing target fluid F in the fluid guide groove 15, it is possible to discharge the contamination flowing into the fluid guide groove 15 to the outside of the fluid guide groove 15 and to suppress the accumulation of the contamination in the fluid guide groove 15. Further, since a part of the sealing target fluid F in the fluid guide groove 15 flows out between the sliding surfaces 11 and 21 while increasing the pressure in a portion on the side of the first dynamic pressure generation groove 16 in the side wall portion 15b, the flow of the sealing target fluid F in the fluid guide groove 15 in the radial direction is promoted (see the arrow L7 of FIGS. 5 and 6).

Specifically, the contamination flowing into the fluid guide groove 15 is mainly discharged to the inner space S1 together with the flow of the sealing target fluid F flowing out from the fluid guide groove 15 to the inner space S1 (see the arrow L5 of FIGS. 5 and 6). Further, a part of the contamination is discharged between the sliding surfaces 11 and 21 together with the flow of the sealing target fluid F flowing out from the fluid guide groove 15 between the sliding surfaces 11 and 21 (see the arrow L7 of FIGS. 5 and 6). Additionally, the amount of the contamination discharged between the sliding surfaces 11 and 21 is smaller than the amount of the contamination discharged into the inner space S1.

Further, since the vortex flow F1 generated in the fluid guide groove 15 can wind up the contamination accumulated in the bottom surface 15a of the fluid guide groove 15 and move the contamination in the radial direction together with the sealing target fluid F, it is easy to discharge the contamination to the outside of the fluid guide groove 15.

Further, the bottom surface 15a of the fluid guide groove 15 is a flat surface which obliquely extends from the communication portion 15c to the outermost radial portion 15d of the bottom surface 15a. That is, the sealing target fluid F of the fluid guide groove 15 smoothly flows in the radial direction. Additionally, the flat surface may allow the sealing target fluid F to flow in the radial direction and may be provided with a step portion that does not obstruct the flow in the radial direction or an unevenness that is unavoidable in manufacturing.

Further, since the communication portion 15c communicating with the inner space S1 in the fluid guide groove 15 is formed to have a larger circumferential width than the top portion side portion of the fluid guide groove 15 on the outer radial side, the inner peripheral surface of the stationary seal ring 10 and the side wall portion 15b of the fluid guide groove 15 are formed at an angle (e.g., obtuse angle) along the circumferential direction. Further, since the fluid is likely to move along the inner peripheral surface of the stationary seal ring 10 and the side wall portion 15b of the fluid guide groove 15 due to the viscosity, it is easy to take the sealing target fluid F of the inner space S1 into the fluid guide groove 15 and to discharge the sealing target fluid F in the fluid guide groove 15 to the inner space S1.

Further, the first dynamic pressure generation groove 16 and the second dynamic pressure generation groove 17 communicate with each other in a region which is shallower than the bottom surface 15a of the fluid guide groove 15. Accordingly, it is possible to ensure a large communication area of the first dynamic pressure generation groove 16, the second dynamic pressure generation groove 17, and the fluid guide groove 15. Then, since a step is formed by the bottom surface 15a of the fluid guide groove 15 and the side wall portion 15b between the first dynamic pressure generation groove 16 and the second dynamic pressure generation groove 17, the contamination existing in the fluid guide groove 15 does not easily enter the first dynamic pressure generation groove 16 and the second dynamic pressure generation groove 17. Further, since it is possible to ensure the height of the side wall portion 15b, it is possible to easily form the vortex flow F1 over the radial direction.

Further, since the outermost radial portion 15d of the bottom surface 15a of the fluid guide groove 15 continuously extends to the flat surface of the land 12, it is possible to discharge the fluid between the fluid guide groove 15 and the sliding surfaces 11 and 21 and to promote the flow of the sealing target fluid F in the fluid guide groove 15 in the radial direction.

Further, the side wall portion 15b of the fluid guide groove 15 has an arc shape when viewed from the axial direction. Accordingly, since a corner portion is not formed in the side wall portion 15b, the sealing target fluid F in the fluid guide groove 15 smoothly flows in the radial direction along the side wall portion 15b without staying.

Further, since the fluid guide groove 15 forms the symmetrical shape in the circumferential direction with respect to the virtual line LN (see FIG. 5) extending in the radial direction, the sealing target fluid F in the fluid guide groove 15 flows along the side wall portion 15b in a well-balanced manner.

Further, the first dynamic pressure generation groove 16 and the second dynamic pressure generation groove 17 communicate with the inner space S1. Accordingly, even when the contamination flows into the first dynamic pressure generation groove 16 and the second dynamic pressure generation groove 17, the contamination can be discharged to the inner space S1 as indicated by the arrow L1" and the arrow L2". Thus, it is possible to suppress the accumulation of the contamination in the first dynamic pressure generation groove 16 and the second dynamic pressure generation groove 17.

Figure 7:
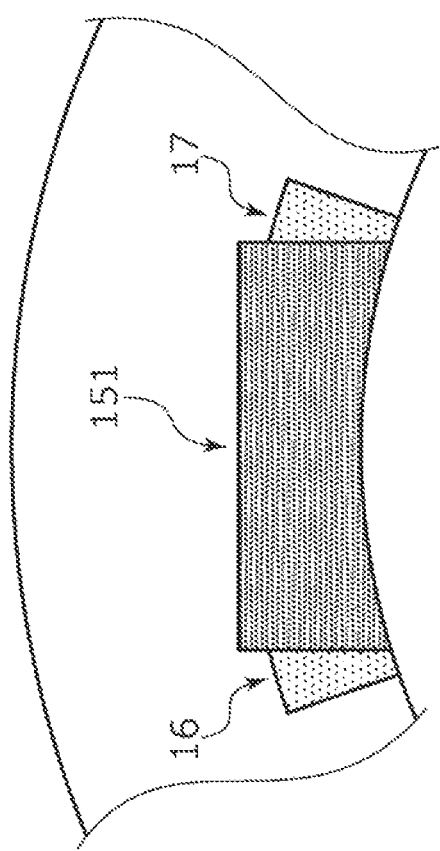
FIG. 7 is an explanatory diagram showing a first modified example of the stationary seal ring in the first embodiment.

Further, in the above-described embodiments, an embodiment in which the side wall portion 15b of the fluid guide groove 15 has an arc shape when viewed from the axial direction has been illustrated, but the present invention is not limited thereto. For example, as shown in FIG. 7, a fluid guide groove 151 may have a substantially rectangular shape when viewed from the axial direction. Specifically, a portion on the side of the inner space S1 may have an arc shape, a portion on the side of the outer space S2 may have a linear shape, and a portion on both radial sides may have a linear shape orthogonal to the line on the side of the outer space S2 so as to surround the fluid guide groove.

Figure 8:
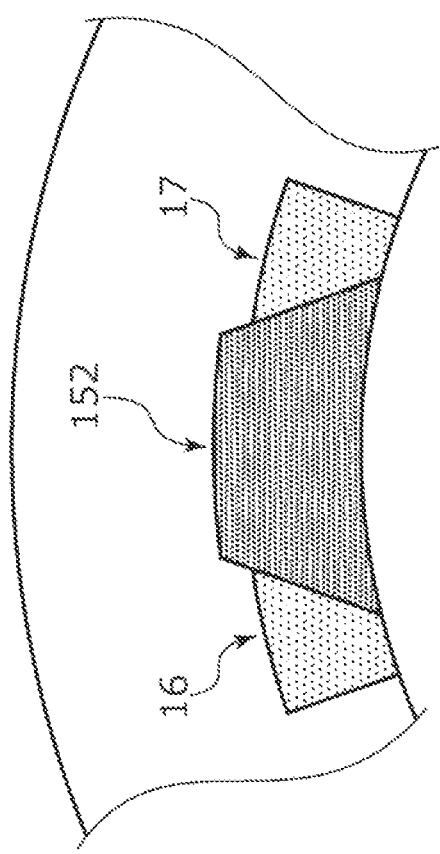
FIG. 8 is an explanatory diagram showing a second modified example of the stationary seal ring in the first embodiment.

Further, as shown in FIG. 8, a fluid guide groove 152 may have a substantially trapezoidal shape having a large width on the side of the inner space S1 when viewed from the axial direction. Specifically, a portion on the side of the inner space S1 may have an arc shape, a portion on the side of the outer space S2 may have a linear shape, and a portion on both radial sides may have a linear shape connected to the line on the side of the outer space S2 at an obtuse angle so as to surround the fluid guide groove.

Figure 9:
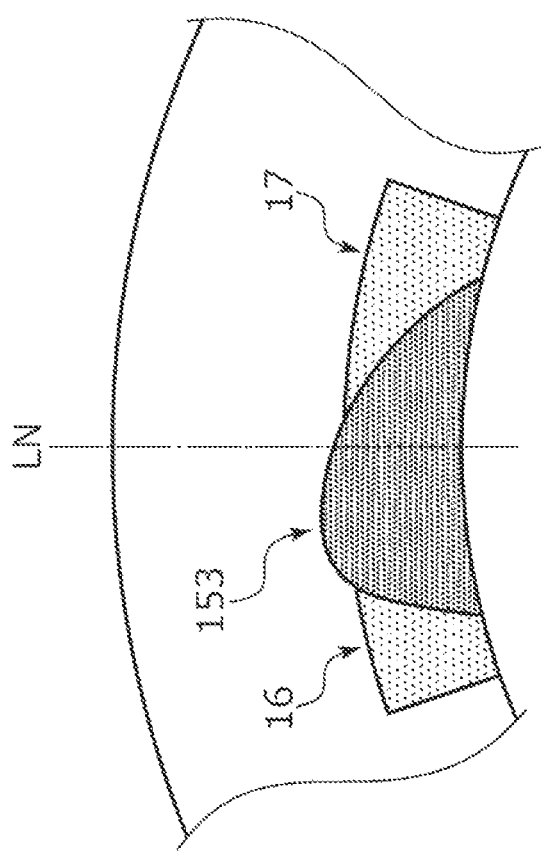
FIG. 9 is an explanatory diagram showing a third modified example of the stationary seal ring in the first embodiment.

Further, in the above-described embodiments, an embodiment in which the fluid guide groove 15 forms the symmetrical shape in the circumferential direction with respect to the virtual line LN extending in the radial direction has been illustrated. However, for example, as shown in FIG. 9, the fluid guide groove 153 may have an oval shape that is asymmetrical in the circumferential direction with respect to the virtual line LN extending in the radial direction. Additionally, the fluid guide groove 153 may have a rectangular shape or another polygonal shape having an asymmetric shape in the circumferential direction with respect to the virtual line LN.

Figure 10:
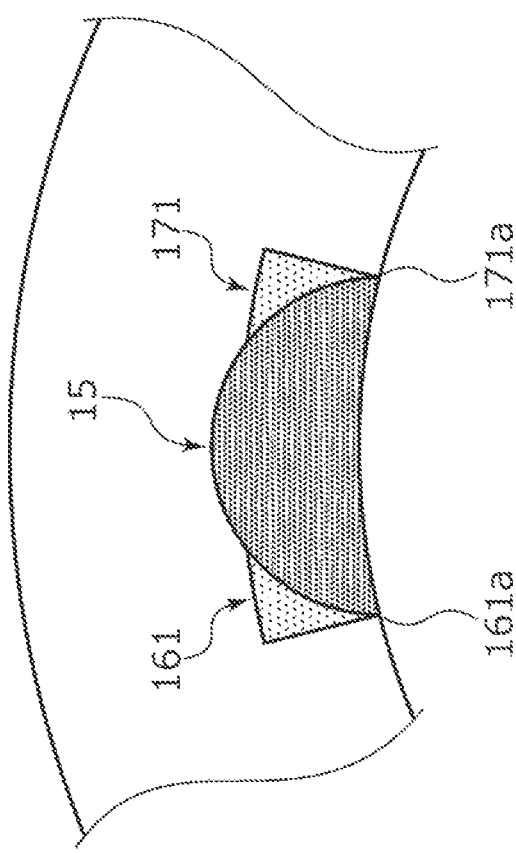
FIG. 10 is an explanatory diagram showing a fourth modified example of the stationary seal ring in the first embodiment.

Further, in the above-described embodiments, an embodiment in which the end portions of the first dynamic pressure generation groove 16 and the second dynamic pressure generation groove 17 on the side of the inner space S1 are located at a position farther from the circumferential end portion of the fluid guide groove 15 in the circumferential direction has been illustrated. However, as shown in FIG. 10, end portions 161a and 171a on the side of the inner space S1 in a first dynamic pressure generation groove 161 and a second dynamic pressure generation groove 171 may be provided at the same circumferential position as the circumferential end portion of the fluid guide groove 15.

Figure 11:
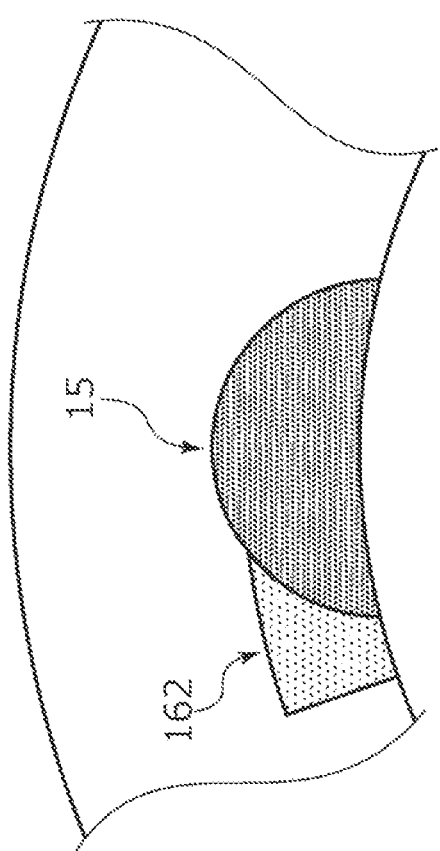
FIG. 11 is an explanatory diagram showing a fifth modified example of the stationary seal ring in the first embodiment.

Further, in the above-described embodiments, an embodiment in which the first dynamic pressure generation groove 16 and the second dynamic pressure generation groove 17 are provided on both circumferential sides of the fluid guide groove 15 to extend has been illustrated. However, as shown in FIG. 11, only the first dynamic pressure generation groove 162 (that is, the positive pressure generation groove) may be provided in the fluid guide groove 15 to extend in the circumferential direction.

Figure 12:
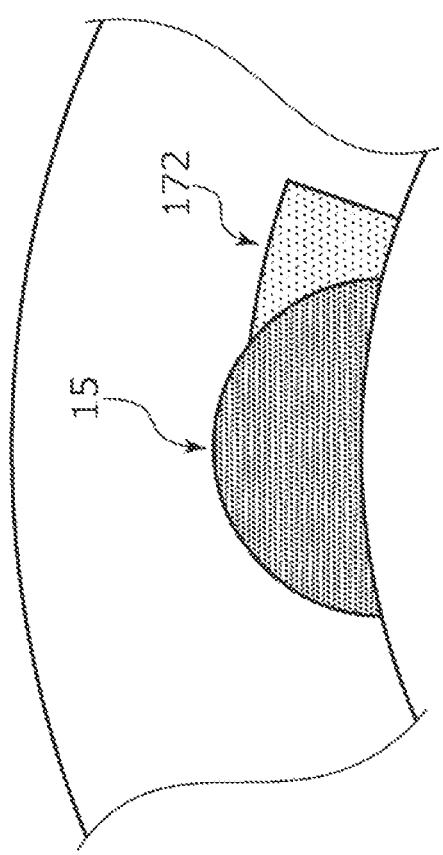
FIG. 12 is an explanatory diagram showing a sixth modified example of the stationary seal ring in the first embodiment.

Further, as shown in FIG. 12, only a second dynamic pressure generation groove 172 (that is, a negative pressure generation groove) may extend in the circumferential direction with respect to the fluid guide groove 15.

Second Embodiment

Next, a sliding component according to a second embodiment of the present invention will be described with reference to FIG. 13. In addition, the description of the configuration overlapping with the same configuration as that of the above-described embodiment will be omitted.

Figure 13:
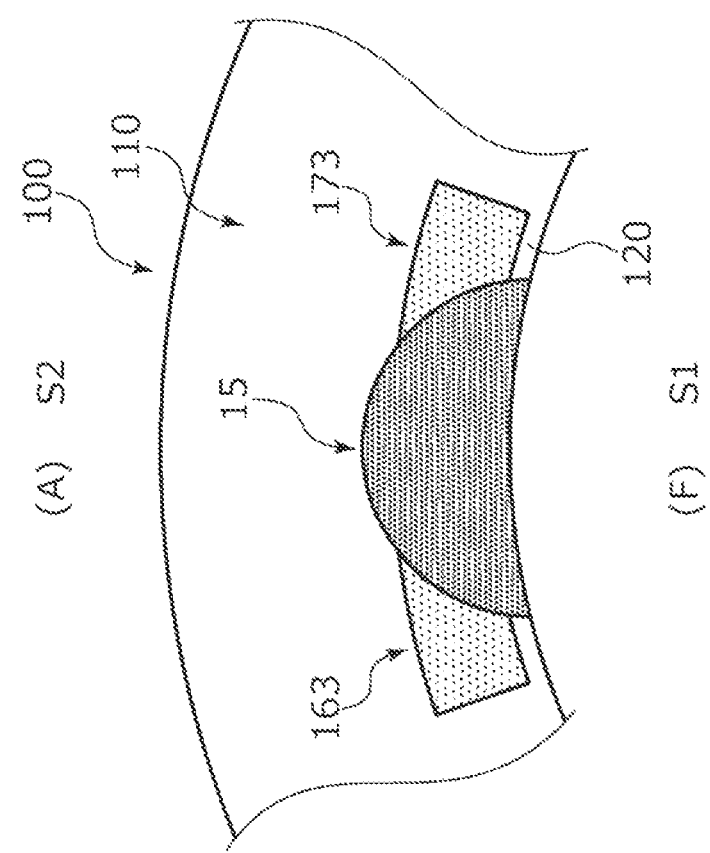
FIG. 13 is an explanatory diagram showing a dynamic pressure generation groove and a conduction groove of a sliding component according to a second embodiment of the present invention.

As shown in FIG. 13, a sliding surface 110 of a stationary seal ring 100 is provided with the fluid guide groove 15, a first dynamic pressure generation groove 163, and a second dynamic pressure generation groove 173. The first dynamic pressure generation groove 163, the second dynamic pressure generation groove 173, and the inner space S1 are defined by a land 120.

Accordingly, since it is possible to suppress the sealing target fluid F of the first dynamic pressure generation groove 163 and the second dynamic pressure generation groove 173 from leaking to the inner space S1, it is possible to reliably generate a dynamic pressure in the first dynamic pressure generation groove 163 and the second dynamic pressure generation groove 173 and to suppress the contamination from flowing from the inner space S1 into the first dynamic pressure generation groove 163 and the second dynamic pressure generation groove 173.

In addition, the shapes of the first to sixth modified examples may be applied to the sliding component of this second embodiment.

Although the embodiments of the present invention have been described with reference to the drawings, the specific configuration is not limited to these embodiments and is included in the present invention even if there are changes or additions within the scope of the present invention.

Figure 14:
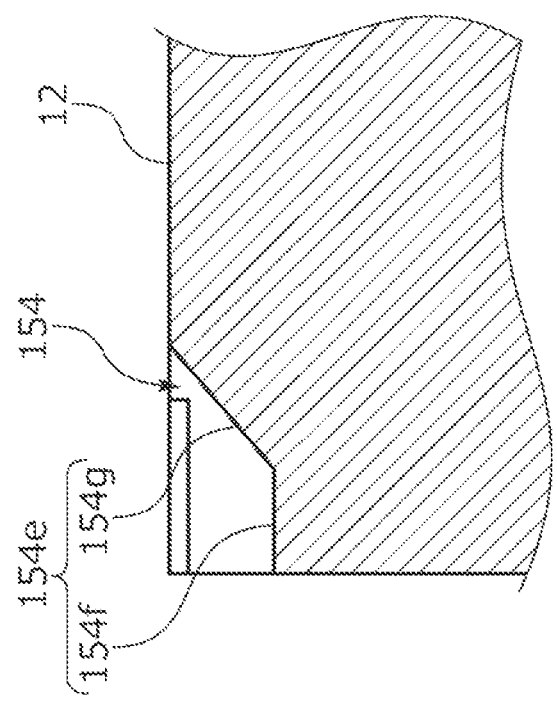
FIG. 14 is an explanatory diagram showing a seventh modified example of the stationary seal ring in the first embodiment or the second embodiment.

For example, in the first and second embodiments and the first to sixth modified examples, an embodiment in which the bottom portion of the conduction groove is inclined in the radial direction and extends to the sliding surface has been illustrated, but the present invention is not limited thereto. For example, at least a part of the bottom portion of the conduction groove may have an inclined surface inclined in the radial direction. For example, as shown in FIG. 14, a bottom portion 154e of a fluid guide groove 154 may include a flat surface 154f which extends in parallel to the flat surface of the land 12 from the inner radial end portion toward the outer radial side and an inclined surface 154g which is inclined from the outer radial end portion of the flat surface 154f toward the flat surface of the land 12.

Further, in the first and second embodiments and the first to sixth modified examples, an embodiment in which the bottom portion of the conduction groove is the flat inclined surface has been illustrated, but for example, the bottom portion may have an inclined surface having a curved surface shape in the cross-sectional view.

Further, in the first and second embodiments and the first to sixth modified examples, an embodiment in which the bottom portion of the conduction groove is inclined to be shallow from the inner radial side, that is, the communication side of the outer space toward the outer space, that is, the closed side of the conduction groove in the radial direction has been illustrated, but the present invention is not limited thereto. For example, an inclined surface which becomes shallow from the closed side of the radial direction to the communication side of the outer space may be used.

Further, in the first and second embodiments and the first to sixth modified examples, an embodiment in which all of the dynamic pressure generation grooves communicate with each other only in a region shallower than the bottom surface of the conduction groove has been illustrated, but the present invention is not limited thereto. For example, a part of the dynamic pressure generation groove may communicate with the conduction groove in a region having the same depth as that of the conduction groove.

Further, in the above-described embodiments, the sealing target fluid has been described as the high-pressure liquid, but the present invention is not limited thereto. For example, the sealing target fluid may be a gas or a low-pressure liquid or may be a mist in which a liquid and a gas are mixed.

Further, in the above-described embodiments, the leakage-side fluid has been described as the atmosphere A corresponding to the low-pressure gas, but the present invention is not limited thereto. For example, the leakage-side fluid may be a liquid or a high-pressure gas or may be a mist in which a liquid and a gas are mixed.

Further, the sealing target fluid side has been described as the high pressure side and the leakage side has been described as the low pressure side. However, the sealing target fluid side may be the low pressure side, the leakage side may be the high pressure side, and the sealing target fluid side and the leakage side may have substantially the same pressure.

Further, in the above-described embodiments, an embodiment of the outside type that seals the sealing target fluid F tending to leak from the inner radial side toward the outer radial side of the sliding surface has been illustrated, but the present invention is not limited thereto. For example, an inside type that seals the sealing target fluid F tending to leak from the outer radial side toward the inner radial side of the sliding surface may be used.

Further, in the above-described embodiments, as the sliding component, the mechanical seal for general industrial machines has been described as an example, but other mechanical seals for automobiles, water pumps, and the like may be used. Further, the present invention is not limited to the mechanical seal and may be a sliding component other than the mechanical seal such as a slide bearing.

Further, in the above-described embodiments, an example in which the conduction groove and the dynamic pressure generation groove are provided on the stationary seal ring has been illustrated, but the conduction groove and the dynamic pressure generation groove may be provided in the rotating seal ring.

Further, in the above-described embodiments, an embodiment in which eight dynamic pressure generation mechanisms each including the conduction groove and the dynamic pressure generation groove are provided on the sliding surface has been illustrated, but the number may be freely changed. Further, the shapes of the conduction groove and the dynamic pressure generation groove can be also freely changed.

Further, in the above-described embodiments, an embodiment in which the inclined surface of the conduction groove is inclined in the radial direction has been illustrated, but the present invention is not limited thereto. For example, the inclined surface may have a component inclined in the circumferential direction in addition to a component inclined in the radial direction.

REFERENCE SIGNS LIST

10 Stationary seal ring (sliding component)
11 Sliding surface
12 Land (land portion)
14 Dynamic pressure generation mechanism
15 Fluid guide groove (conduction groove)
15a Bottom surface (bottom portion)
15b Side wall portion
15c Communication portion (first radial end portion)
15d Outermost radial portion (second radial end portion)
16 First dynamic pressure generation groove (dynamic pressure generation groove)
17 Second dynamic pressure generation groove (dynamic pressure generation groove)
20 Rotating seal ring (opposite sliding component)
21 Sliding surface
100 Stationary seal ring (sliding component)
110 Sliding surface
120 Land
151 to 153 Fluid guide groove (conduction groove)
161 to 163 First dynamic pressure generation groove (dynamic pressure generation groove)
171 to 173 Second dynamic pressure generation groove (dynamic pressure generation groove)
A Atmosphere
F Sealing target fluid
F1 Vortex flow
S1 Inner space (outer space)
S2 Outer space (outer space)

The invention claimed is:

1. A sliding component formed in an annular shape and disposed at a relatively rotating position of a rotating machine and sliding relative to an opposite sliding component,
wherein a sliding surface of the sliding component is provided with a conduction groove having an opening which communicates with an outer space and a dynamic pressure generation groove communicating with the conduction groove, extending in a circumferential direction, and having a closed terminating end portion,
wherein at least a part of a bottom portion of the conduction groove is provided with an inclined surface inclined with respect to a radial direction,
wherein the conduction groove has a protruded end portion which is protruded from the dynamic pressure generation groove in the radial direction toward a radial end side opposed to the opening, and
wherein the protruded end portion is a closed end surrounded by a land portion.

2. The sliding component according to claim 1,
wherein the inclined surface is formed entirely through the bottom portion of the conduction groove in the radial direction.

3. The sliding component according to claim 2,
wherein the conduction groove has a first radial end portion on a side of the outer space and a second radial end portion on a side opposite to the outer space, a circumferential width of the first radial end portion being larger than a circumferential width of the second radial end portion.

4. The sliding component according to claim 2,
wherein the dynamic pressure generation groove wholly communicates with a portion of the conduction groove shallower than the inclined surface.

5. The sliding component according to claim 2,
wherein the inclined surface is continuously connected to the sliding surface.

6. The sliding component according to claim 2,
wherein a side wall portion of the conduction groove has an arc shape when viewed from an axial direction.

7. The sliding component according to claim 2,
wherein the dynamic pressure generation groove communicates with the outer space.

8. The sliding component according to claim 2,
wherein the dynamic pressure generation groove and the outer space are separated from each other by a land portion.

9. The sliding component according to claim 1,
wherein the conduction groove has a first radial end portion on a side of the outer space and a second radial end portion on a side opposite to the outer space, a circumferential width of the first radial end portion being larger than a circumferential width of the second radial end portion.

10. The sliding component according to claim 9,
wherein the dynamic pressure generation groove wholly communicates with a portion of the conduction groove shallower than the inclined surface.

11. The sliding component according to claim 9,
wherein the inclined surface is continuously connected to the sliding surface.

12. The sliding component according to claim 9,
wherein a side wall portion of the conduction groove has an arc shape when viewed from an axial direction.

13. The sliding component according to claim 9,
wherein the dynamic pressure generation groove communicates with the outer space.

14. The sliding component according to claim 9, wherein the dynamic pressure generation groove and the outer space are separated from each other by a land portion.

15. The sliding component according to claim 1, wherein the dynamic pressure generation groove wholly communicates with a portion of the conduction groove shallower than the inclined surface.

16. The sliding component according to claim 15, wherein the inclined surface is continuously connected to the sliding surface.

17. The sliding component according to claim 1, wherein the inclined surface is continuously connected to the sliding surface.

18. The sliding component according to claim 1, wherein a side wall portion of the conduction groove has an arc shape when viewed from an axial direction.

19. The sliding component according to claim 1, wherein the dynamic pressure generation groove communicates with the outer space.

20. The sliding component according to claim 1, wherein the dynamic pressure generation groove and the outer space are separated from each other by a land portion.

* * * * *